(12) United States Patent
Owens et al.

(10) Patent No.: US 11,083,176 B2
(45) Date of Patent: Aug. 10, 2021

(54) CHANNELED-WATER FISHING LURE

(71) Applicant: SEA LIME FISHING LURES, LLC, Tampa, FL (US)

(72) Inventors: Clint Owens, Tampa, FL (US); Joseph Navarro, Jr., Largo, FL (US); Steven Owens, Hawthorne, FL (US)

(73) Assignee: SEA LIME FISHING LURES, LLC., Tampa, FL (US)

( * ) Notice: Subject to any disclaimer, the term of this patent is extended or adjusted under 35 U.S.C. 154(b) by 0 days.

(21) Appl. No.: 15/626,162

(22) Filed: Jun. 18, 2017

(65) Prior Publication Data

US 2017/0360018 A1 Dec. 21, 2017

Related U.S. Application Data

(60) Provisional application No. 62/493,041, filed on Jun. 20, 2016.

(51) Int. Cl.
*A01K 85/00* (2006.01)
(52) U.S. Cl.
CPC .................................. *A01K 85/00* (2013.01)
(58) Field of Classification Search
CPC ...................................................... A01K 85/00
USPC ....................................................... 43/42.06
See application file for complete search history.

(56) References Cited

U.S. PATENT DOCUMENTS

| | | | | |
|---|---|---|---|---|
| 1,585,943 A * | 5/1926 | Streich | .................... | A01K 85/14 43/42.18 |
| 2,027,069 A * | 1/1936 | Sorenson | ............... | A01K 85/16 43/42.06 |
| 2,578,786 A * | 12/1951 | Davis | ..................... | A01K 85/16 43/42.22 |
| 2,659,995 A * | 11/1953 | Hagstrom | .............. | A01K 85/16 43/42.06 |
| 2,927,392 A * | 3/1960 | Lievense | ................ | A01K 85/00 43/42.39 |
| 3,344,549 A * | 10/1967 | Peters | ..................... | A01K 85/00 43/42.11 |
| 3,426,467 A * | 2/1969 | Bryant | ................... | A01K 85/00 43/42.28 |
| 3,490,165 A * | 1/1970 | Thomassin | ............ | A01K 85/18 43/42.09 |
| 3,521,394 A * | 7/1970 | Wintersberger | ....... | A01K 85/16 43/42.06 |
| 3,740,891 A * | 6/1973 | Rubenstein | ............ | A01K 85/00 43/42.02 |
| 5,261,181 A * | 11/1993 | Melton | ................... | A01K 85/00 43/42.06 |
| 5,377,442 A * | 1/1995 | Gariglio | ................. | A01K 83/06 43/44.2 |
| 5,778,593 A * | 7/1998 | Baron | ..................... | A01K 85/00 43/41 |

(Continued)

*Primary Examiner* — Christopher P Ellis
(74) *Attorney, Agent, or Firm* — Smith Tempel; Steven P. Wigmore (57) ABSTRACT

Embodiments of the present disclosure relate generally to fishing lures that employ channeled water technology. Embodiments further relate to fishing lures with a vented head configured to allow removal and replacement of a swim body. In specific embodiments, the vented head is provided as a two-piece configuration having locational alignment features and lateral securement features for maintaining the swim body in a secured position.

20 Claims, 8 Drawing Sheets

(56) References Cited

U.S. PATENT DOCUMENTS

| | | | | |
|---|---|---|---|---|
| 6,408,565 | B1* | 6/2002 | Duncan | A01K 85/18 43/42.06 |
| 7,263,798 | B2* | 9/2007 | Nichols | A01K 85/18 43/42.09 |
| 7,637,050 | B2* | 12/2009 | Brick | A01K 85/16 43/42.09 |
| 8,789,307 | B1* | 7/2014 | Talbot | A01K 85/16 43/42.09 |
| 2007/0199232 | A1* | 8/2007 | Littlejohn | A01K 85/00 43/42.1 |
| 2008/0104877 | A1* | 5/2008 | Claverie, III | A01K 85/16 43/42.09 |
| 2008/0289244 | A1* | 11/2008 | Parks | A01K 85/00 43/42.3 |
| 2010/0050497 | A1* | 3/2010 | Brown | A01K 85/00 43/42.24 |
| 2012/0023804 | A1* | 2/2012 | Hogan | A01K 85/00 43/42.39 |
| 2012/0285069 | A1* | 11/2012 | Baumgardner | A01K 85/00 43/4.5 |
| 2013/0074395 | A1* | 3/2013 | Farr, Jr. | A01K 85/01 43/42.31 |
| 2015/0201592 | A1* | 7/2015 | Senter | A01K 85/00 43/17.6 |
| 2016/0338330 | A1* | 11/2016 | Bendel | A01K 91/04 |
| 2017/0258061 | A1* | 9/2017 | Korteweg | A01K 85/02 |

* cited by examiner

CHANNELED-WATER FISHING LURE

CROSS-REFERENCE TO RELATED APPLICATIONS

This application claims the benefit of U.S. Provisional Application Ser. No. 62/493,041, filed Jun. 20, 2016, titled "Channeled Water Technology used in a Fishing Lure," the entire contents of which are hereby incorporated by reference.

FIELD OF THE DISCLOSURE

Embodiments of the present disclosure relate generally to fishing lures that employ channeled water technology. Embodiments further relate to fishing lures with a vented head configured to allow removal and replacement of a swim body. In specific embodiments, the vented head is provided as a two-piece configuration having locational alignment features and lateral securement features for maintaining the swim body in a secured position.

BACKGROUND

Artificial fishing lures come in many shapes and forms with many being specifically designed to attempt to simulate the underwater action and/or appearance of a swimming baitfish. For example, many offshore fishing lures comprise a rigid plastic body with paddle tails or spoon bills that give it some or little action. Others consist of a collection of plastic streamers attached to a metal or plastic head that, at best, produce a bubble stream. Despite the availability and commercial success of many different types of artificial fishing lures, the fact remains that their motion is often stiff, unrealistic, and inadequate to attract fish.

BRIEF SUMMARY

Embodiments of this disclosure thus provide an improved fishing lure that uses channeled water technology to generate fish-like movement. Water enters a tapered channel of a vented head while the lure is being pulled through water and then travels through an open space of a flexible swim body. The hydrodynamic force of the water channeled through the vented head and the flexible swim body provides back and forth sideways undulation of the flexible swim body, mimicking the appearance of a swimming baitfish swimming.

An exemplary embodiment of a fishing lure comprises a vented head and a swim body. The vented head comprises an open channel with a rearward taper. The swim body defines an open space in fluid communication with the open channel and is configured to be secured to the vented head.

Another embodiment of a fishing lure comprises a head and a swim body. The head comprises a rearward-tapered channel extending through an angled front face and a rear face. The swim body extends from the rear face of the head and defines an open space in fluid communication with the rearward-tapered channel.

DETAILED DESCRIPTION

Figure 1:
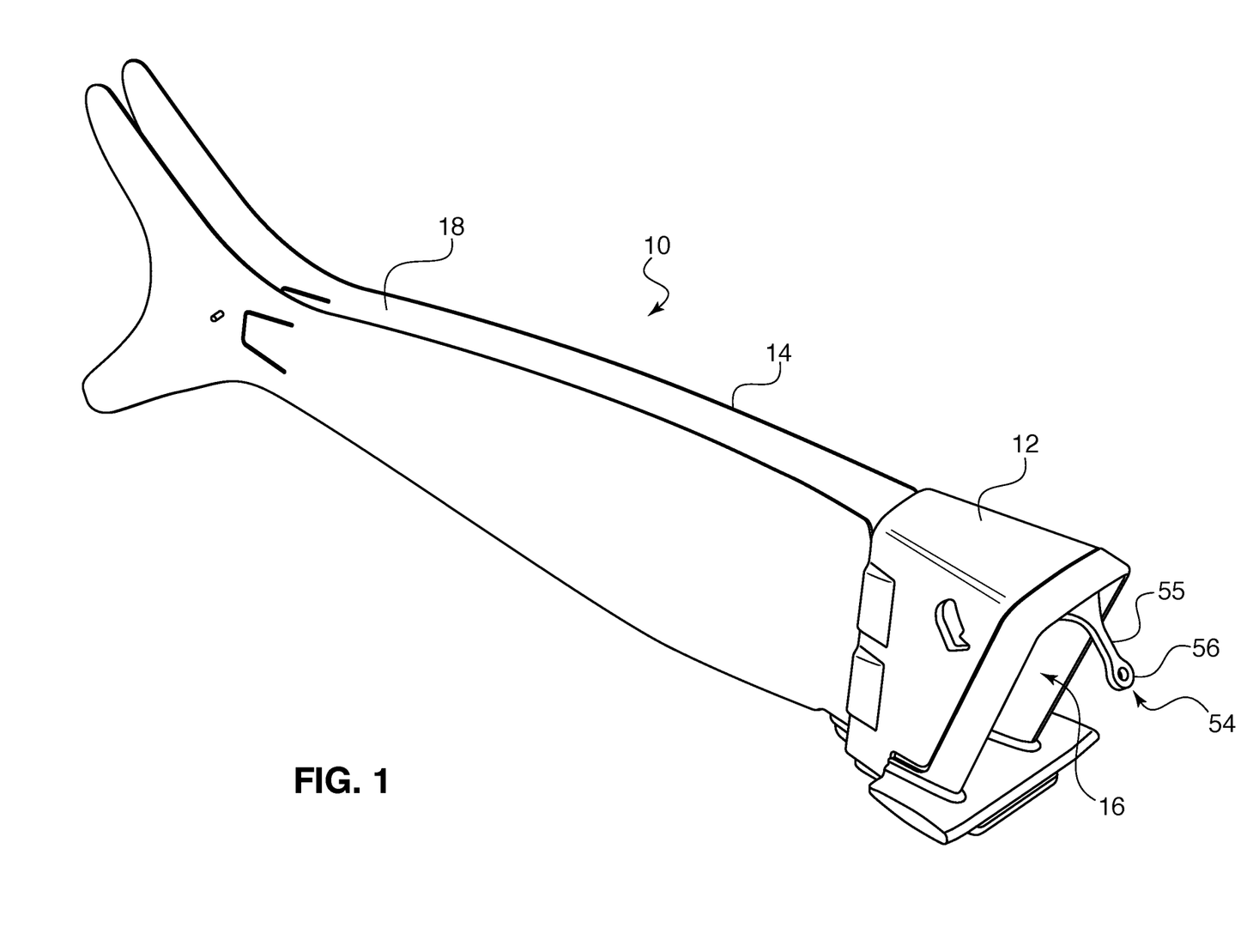
FIG. 1 shows a perspective view of an assembled fishing lure.

Embodiments of the present disclosure provide a channeled-water fishing lure 10 designed to channel water flow therethrough during use. The channeled-water fishing lure 10 may be implemented in various types of fishing lures (e.g., trolling lures, castable lures, etc.). As illustrated by FIG. 1, the lure is provided with a vented head 12 and a swim body 14. The vented head 12 is designed with an open channel 16 therethrough. In use at trolling speeds or when being reeled in, water enters and flows through the open channel 16 in the vented head 12 and through an open space 18 in the swim body 14. The open channel 16 and the open space 18 are in fluid communication with one another and collectively provide channeled water technology, which generates a fish-like movement when the lure 10 is pulled.

Figure 2:
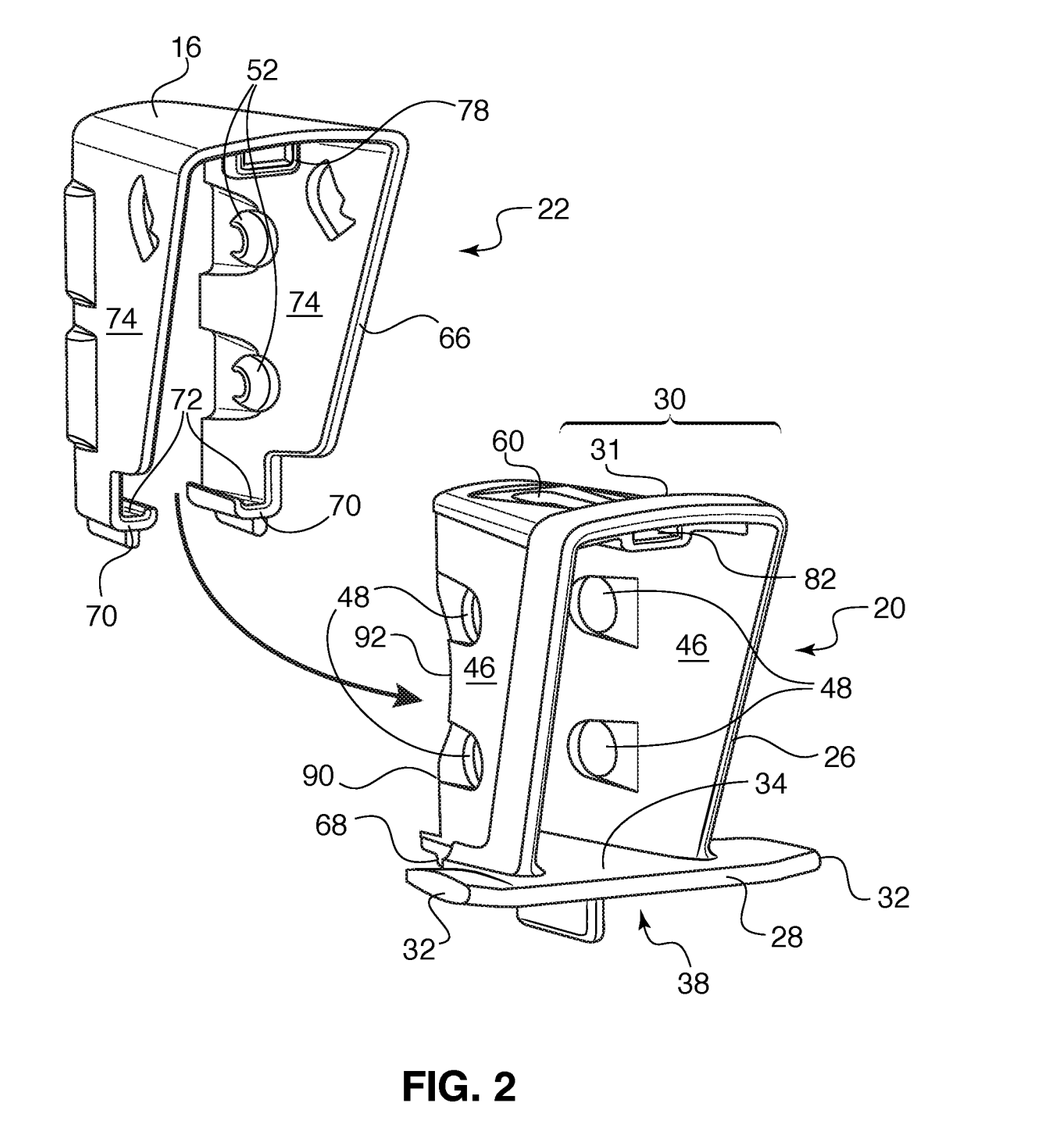
FIG. 2 shows a perspective view of a head base and head cover, prior to securement.
Figure 3:
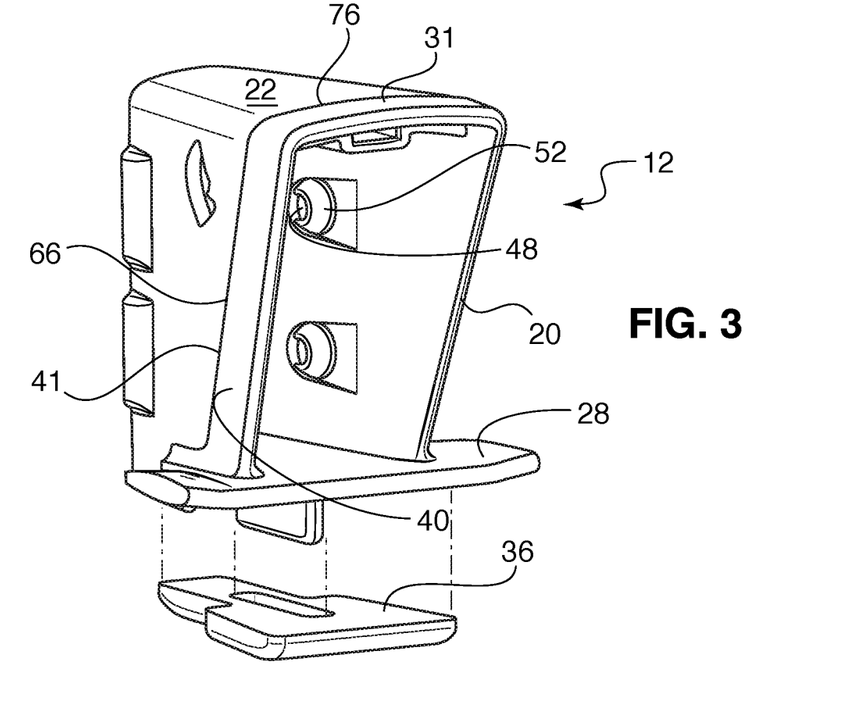
FIG. 3 shows a head base and head cover in an engaged configuration.

In the example illustrated by FIGS. 2 and 3, the vented head 12 may be provided as a two-piece configuration. Providing the two-piece configuration may assist with removal and replacement of the swim body 14. FIG. 2 shows a head base 20 and a head cover 22. FIG. 3 shows the head base 20 and the head cover 22 in fixed engagement, such that the head base 20 is nested within the head cover 22. In use with a swim body 14, a forward portion 24 of the swim body 14 may be secured between the head base 20 and head cover 22, as illustrated by FIGS. 5-7 and as described in more detail below.

Figure 4:
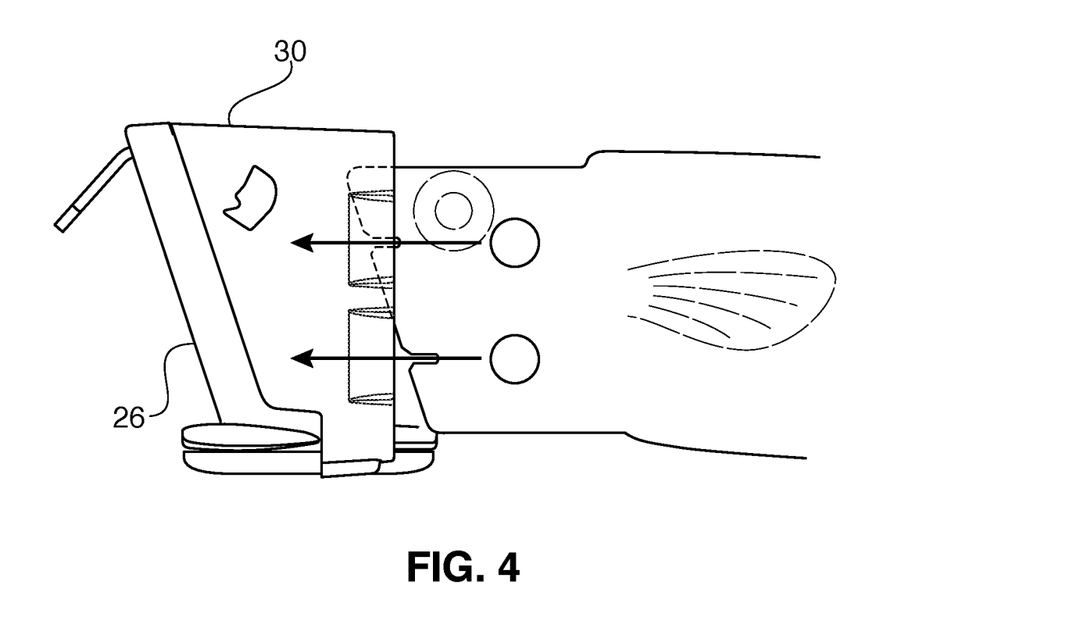
FIG. 4 shows a side plan view of a vented head.
Figure 12:
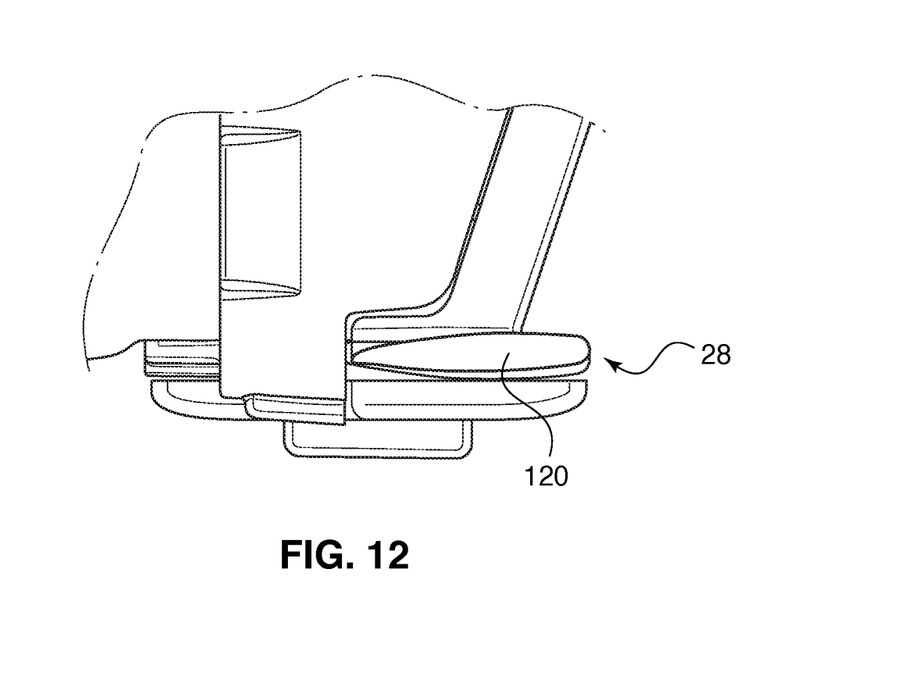
FIG. 12 shows a side view of a lower portion of the vented head, illustrating a neutral wing foil surface on the lower wing.

Head base 20 is shown as having an angled front face 26. This angled front face 26 geometry helps to prevent the lure 10 from flipping over as water enters the vented head 12. The angled front face 26 extends from a lower wing 28 up to an upper hood 30. As shown by FIG. 4, if viewed from the side, a vertical plane aligned with the front edge of the upper hood 30 would extend beyond a vertical plane aligned with the front edge of the lower wing 28 a predetermined distance to produce a corresponding angle. In this manner, the lower wing 28 is disposed in a posterior relationship to the front edge of the upper hood 30. In one embodiment, the lower wing 28 may be configured as a dihedral wing. The dihedral wing shape may curve slightly upward to provide a self-adjusting mechanism, which helps the lure 10 level off in the event one side of the lower wing 28 drifts upward. As illustrated in FIG. 12, the ends of each side of the lower wing 28 may be configured with a neutral wing foil surface 120 that may enable the lure 10 to move through the water without descending too deep or too close to the surface of the water. Furthermore, the dihedral wing shape for the lower wing 28 helps to provide hydrodynamic stability and action for the lure as it is pulled through the water. It should be further appreciated that the geometry and dimensions of the vented head 12 (e.g., angled front face 26 geometry, lower wing 28) may be varied to optimize the hydrodynamic forces applied to the channeled-water lure 10 to create a life-like undulation simulating a realistic swimming action of a baitfish. As shown by FIGS. 2 and 3, side edges 32 of the lower wing 28 may have a slight upward curvature as compared to the floor 34 of the lower wing 28.

Figure 5:
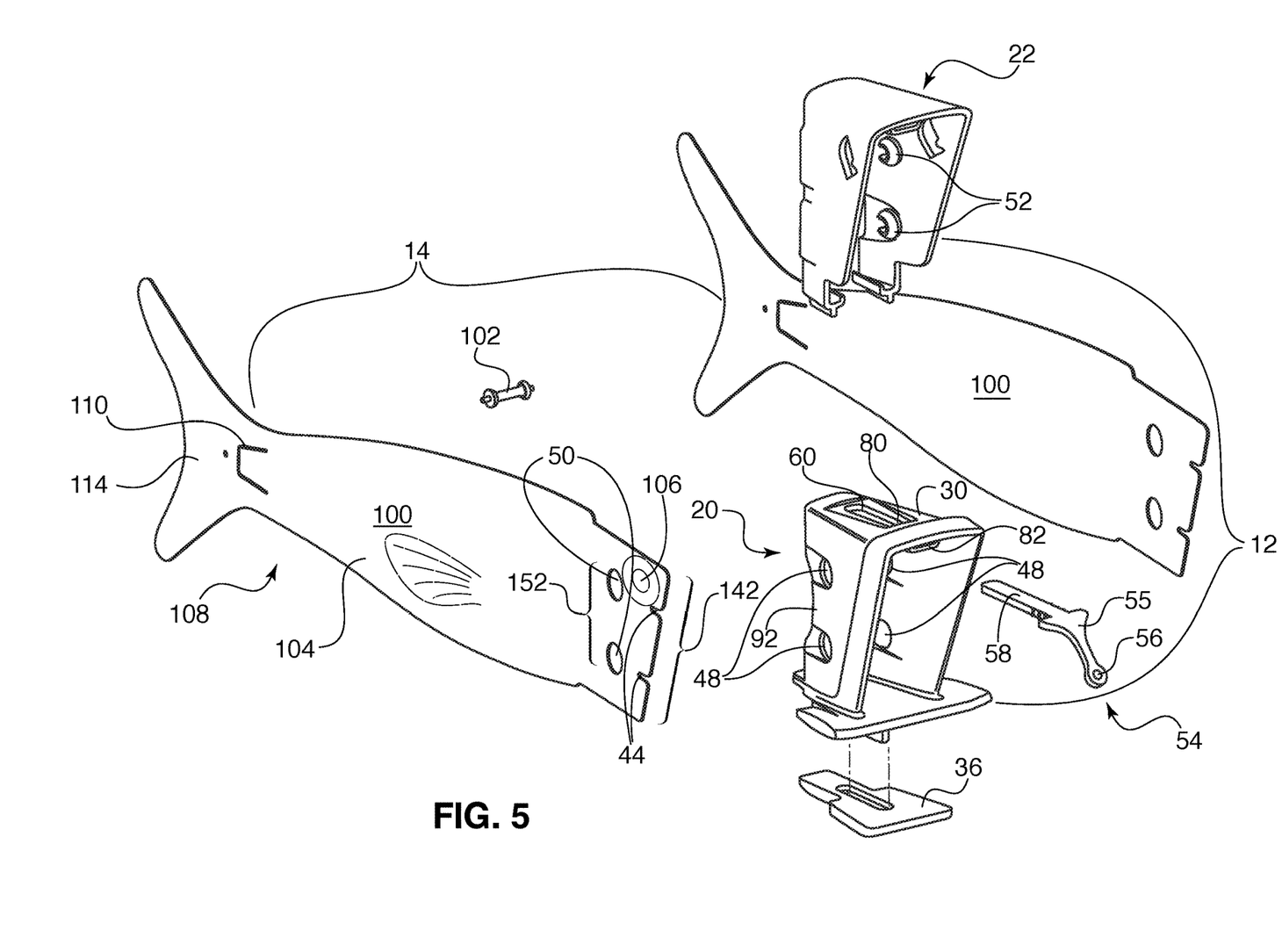
FIG. 5 shows an exploded perspective view of the fishing lure of FIG. 1.

As shown by FIG. 3 and the exploded view of FIG. 5, the head base 20 is also provided with a weight 36 associated along a lower portion 38 of the head base 20. In one example, the weight 36 may be secured below the lower wing 28. The weight may have an opening that is received by a fin extending from lower portion 38 of the base 20. It should be understood, however, that weight 36 may be secured and positioned anywhere appropriate along the lower portion 38 that allows balance and appropriate flow of the lure 10. Exemplary locations include below the lower wing 28, on the floor 34 of the lower wing 28, along sides of the angled front face 26, or any combination thereof. In one specific example, the weight 36 is a 14 gram weight that provides additional stability while trolling, although the size, dimensions, location, and mass of the weight 36 may be varied to coordinate with the geometry, mass, and dimensions of the vented head 12 and the swim body 14.

Figure 6:
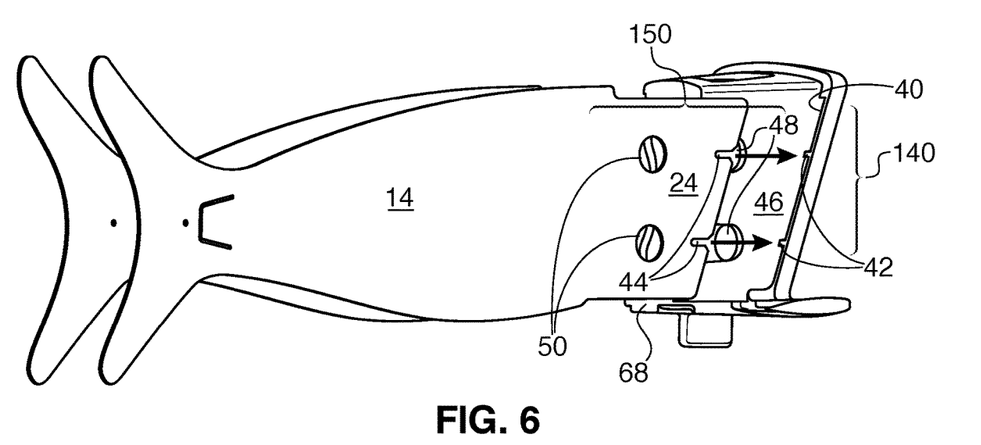
FIG. 6 shows a head base during positioning of a swim body with respect thereto.
Figure 7:
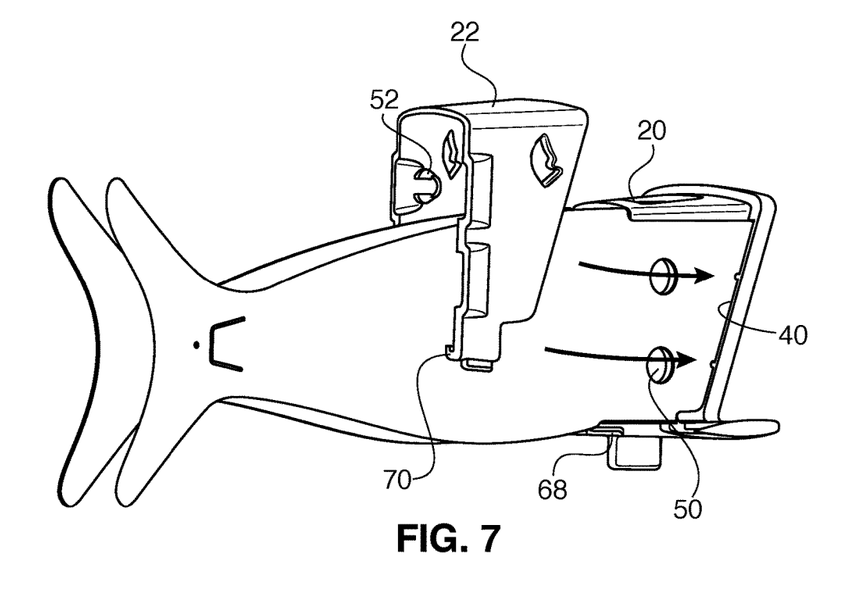
FIG. 7 shows the assembly of FIG. 6, with insertion of a head cover.

As shown by FIG. 6, the head base 20 is also provided with a swim body securement system. The swim body securement system may include locational alignment features 140, as well as lateral securement features 150. In one embodiment, the angled front face 26 defines a securement channel 40 along a perimeter thereof. As illustrated by FIG. 6, the securement channel 40 defines a tight groove into which forward portion 24 of the swim body may be positioned. The securement channel 40 may have one or more optional placement tabs 42 configured to receive body grooves 44 at the front portion 24 of the swim body 14. FIG. 7 shows body grooves 44 in position with respect to tabs 24. The embodiment of FIGS. 6 & 7 illustrate two placement tabs 42 within each side of the securement channel 40, for a total of four placement tabs. Other options are possible and considered within the scope of this disclosure. Alignment of the body grooves 44 with respect to the placement tabs 42 locationally aligns the swim body 14 with respect to the vented head 12.

The head base 20 is also provided with a lateral securement feature 150 for the swim body 14. In one embodiment, side walls 46 of the head base 20 have apertures 48 that align with corresponding apertures 50 of the swim body 14 when the swim body 14 is locationally aligned with the head base 20. FIGS. 5 and 6 shows two apertures 48 along each side wall 46, for a total of four apertures 48. Other options are possible and considered within the scope of this disclosure. In use and for securement, internal pegs 52 of the head cover 22 are received by the apertures 48, 50, as described further below.

A lower rear area of each of the sidewalls 46 features securement lips 68. The securement lips 68 protrude just slightly downwardly from the side walls 46 and will be described in more detail below with respect to head base/head cover engagement.

The upper hood 30 of the head base 20 receives a leader arm 54. Leader arm 54 includes a loop hook 56 that is configured to receive leader line (not shown). Leader arm 54 also includes an extension arm 58. Extension arm 58 is configured to be received by arm groove 60 of the upper hood 30 of the head base 20. The extension arm 58 may function to help secure head base 20 with respect to head cover 22, as described further below. It should be appreciated that the design and location of the leader arm 54 may support desirable cooperation with the hydrodynamic forces applied to the channeled-water lure 10. As illustrated in the embodiment of FIG. 5, the loop hook 56 may be disposed on a portion 55 extending downward from the extension arm 58 at a desirable angle. The downward angle and length of the portion 55 and the length of the extension arm 58 may provide a desirable contact point for providing directional force to the lure 10 that cooperates with the hydrodynamic forces resulting from the channeled-water lure 10. The side view of the vented head 12 in FIG. 4 illustrates that the downward angled portion 55 of the leader arm 54 may increase the upward force exerted on the lure 10 while being pulled. In this regard, it should be appreciated that the downward angled portion 55 may advantageously combine with other lure features, lure shapes, lure dimensions described herein (e.g., angled front face 26, anterior position of the lower wing 28, rearward taper 130, etc.) to optimize the hydrodynamic forces applied to the lure 10 and result in desirable fish-like movement while in use.

Figure 8:
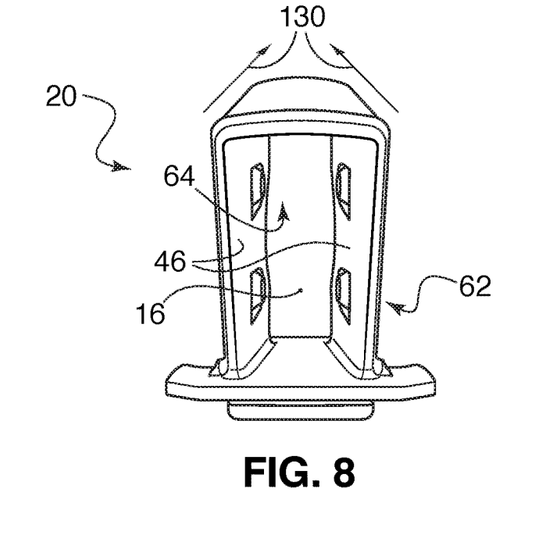
FIG. 8 shows a front plan view of a vented head illustrating a tapered channel.
Figure 9:
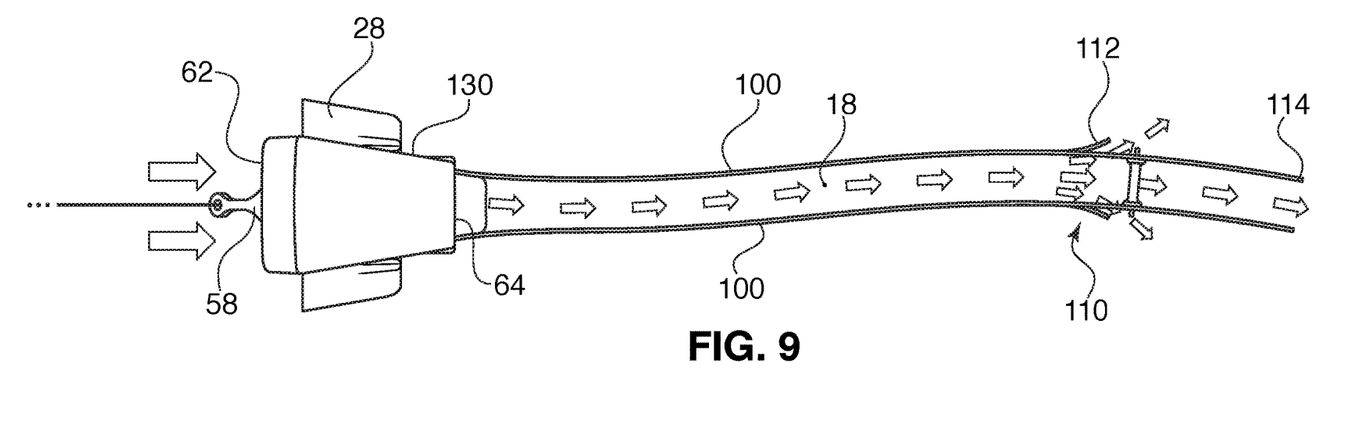
FIG. 9 shows a top plan view of a fishing lure, illustrating flow of water therethrough.
Figure 10:
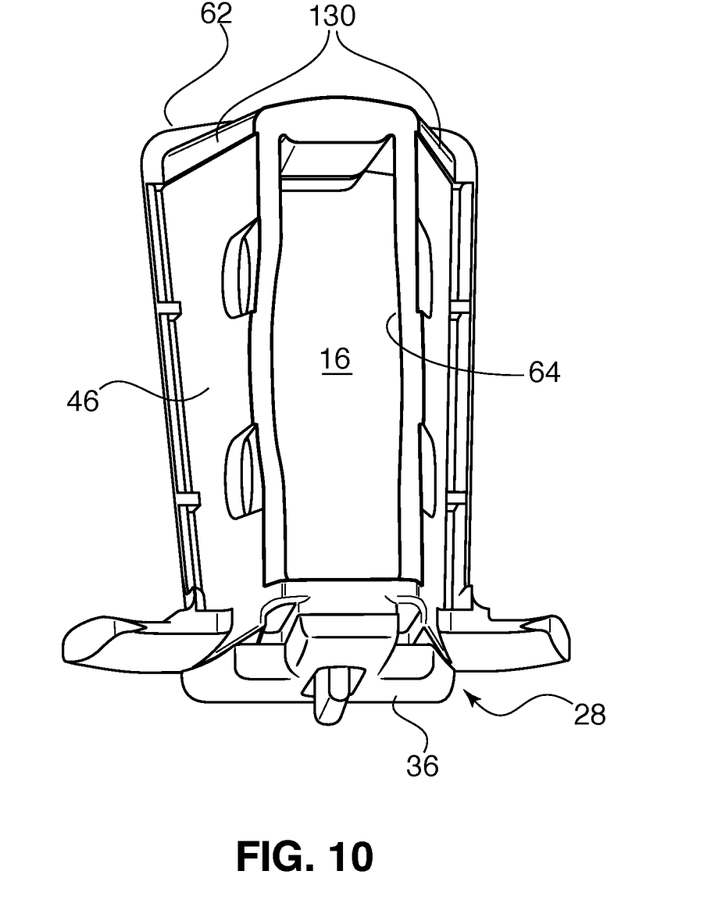
FIG. 10 shows a rear perspective view of a head base, illustrating tapered sidewalls.

As illustrated by FIGS. 8-10, the open channel 16 through the vented head 12 may be provided with a rearward taper 130. This rearward taper 130 may be defined by side walls 46 that angle slightly inwardly toward one another. For example, the open channel 16 of the head base 20 is defined by a first open face 62 (defined by the perimeter of the angled front face 26) and a second open face 64 at a rear portion of the head base 20. In one example, the first open face 62 defines a wider area than the second open face 64. When the head base 20 is viewed in a front plan view, the result is that first open face 62 is larger in area than the second open face 64, and the side walls 46 can be seen as having an inward taper toward one another. This rearward taper 130 of the open channel 16 can help channel water from the larger face 62 to the smaller face 64, causing water to be forced into the narrowed channel 16. Forcing a narrowed flow of water in this way can help prevent the lure 10 from flipping over as water flows therethrough.

In use, head base 20 and head cover 22 collectively engage with one another as shown by FIG. 3 to form vented head 12. Various types of engagement are possible and considered within the scope of this disclosure. One non-limiting engagement example is described herein.

Referring now to the head cover 22, FIG. 2 shows that one embodiment of the head cover 22 may be formed as having a U-shaped cross-section. The head cover 22 is sized only slightly larger than the head base 20, such that the head cover 22 can fit snugly over the head base 20. The head cover 22 has an angled front face 66 that generally corresponds to the shape and angle of the angled front face 26 of the head base 20. When the head cover 22 is positioned over the head base 20 as shown by FIG. 3, the angled front face 66 of the head cover 22 abuts a rear wall 41 of the securement channel 40 of the head base 20.

Figure 11:
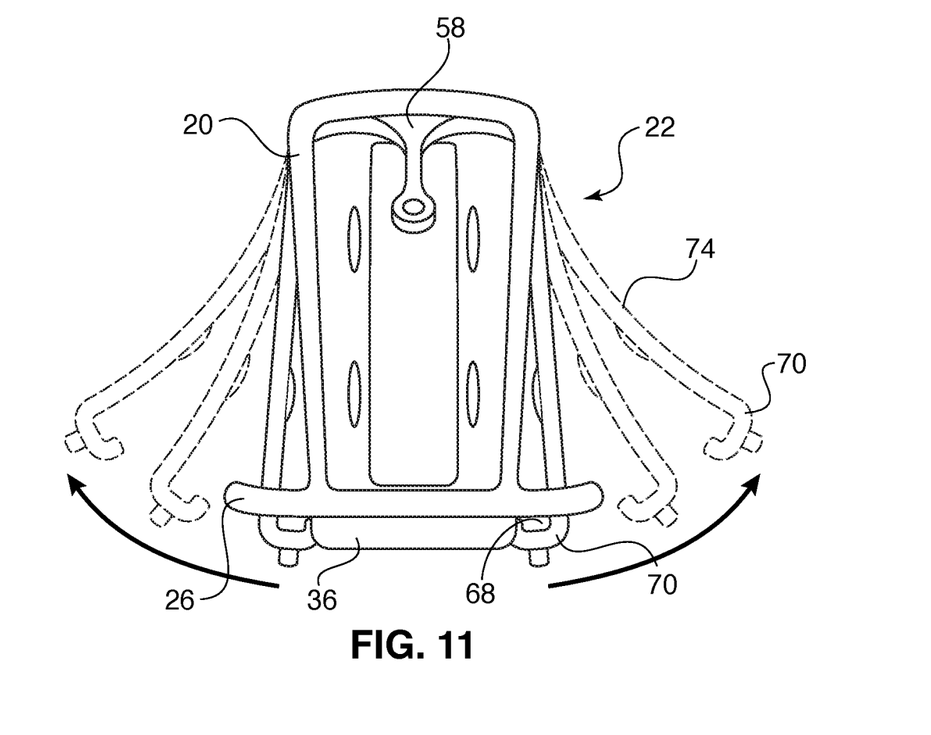
FIG. 11 shows a front plan view of a vented head, illustrating side flexing of legs of head cover.

Along a lower portion of the head cover 22 are engagement feet 70. In the examples shown, engagement feet 70 define clasping areas with grooves 72 therein. When the head cover 22 is positioned over the head base 20, the grooves 72 of the engagement feet 70 are received over securement lips 68 of the head base 20. The side legs 74 of the head cover 20 are generally rigid but provided with a level of flexibility. The rigidity of the side legs 74 allows them to lie parallel with the sidewalls 46 of the head base 20 to pinch the forward portion 24 of swim body 14 in place in use. However, the flexibility of the side legs 74 also allows them to be extended outwardly from the head base 20, as illustrated by FIG. 11. In this configuration, the engagement feet 70 may be pulled from engagement with the securement lips 68, allowing side legs 74 to be pulled away from sidewalls 46. As shown by FIGS. 2 and 5, a rear back edge 90 of each sidewall 46 of the head base 20 may be provided with an optional notch 92. If provided, the notches 92 define an indentation area to allow space for a user's fingers to grasp the rear edge/inner portion of the side leg 74 for flexing the leg away from the head base 20. This allows positioning of the swim body 14, as will be described further below.

Head cover 22 also features internal pegs 52. The internal pegs 52 are sized and configured such that they may be received by apertures 48 of the head base 20. For example, if the apertures 48 are circular, the pegs 52 may be at least partially circular protrusions, extending inwardly from the side legs 74. Other shapes and options are considered within the scope of this disclosure. The inward dimensions or height of the pegs 52 may correspond generally to the thickness of the sidewalls 46.

The head cover 22 also has an upper hood 76. The front portion of upper hood 76 of the head cover 22 similarly abuts the rear wall 31 of the upper hood 30 of the head base 20 in use. An internal portion of the upper hood (which is the head base-facing side of the head cover 22 in use) may be provided with a bracket 78. This bracket 78 is sized and configured to receive the extension arm 58 of the leader arm 54. It is generally envisioned that this securement between the bracket 78 and the extension arm 58 be conducted at the manufacturing facility such that the head base 20 and head cover 22 are not intended to be separated by the end-user.

In order to accommodate the initial securement, the arm groove 60 of the head base 20 may have a bracket opening 80 that extends through the thickness of the upper hood 30 and a bracket channel 82 along a forward interior portion of the upper hood 30. During manufacture, when the head cover 22 is positioned on the head base 20 (with the engagement feet 70 secured around the securement lips 68 and with the pegs 52 engaging the apertures 48), the bracket 78 of the head cover 22 is received by the bracket opening 80 of the head base 20. The leader arm 58 is slid into and through the bracket channel 82, through the bracket 78, and the extension arm 58 is allowed to rest in the arm groove 60. With the head base 20 and the head cover 22 secured in this way, they are not easily separable by the user. In order to remove and replace a swim body 14, the side legs 74 of the head cover 22 are detached from the securement lips 68 and flexed outwardly, as shown by FIG. 11.

Referring now to the swim body 14 and its attachment to the vented head 12, reference is made to FIGS. 1 and 5-7. In a specific embodiment, the swim body 14 comprises two flexible body portions 100 that are joined via a connection element 102.

Body portions 100 define an open space 18 therebetween. The presence of connection element 102 prevents the two body portions 100 from flapping open while the lure 10 is being pulled through water. Body portions 100 may be made out of any appropriate flexible material that can withstand being pulled through water at typical trolling speeds (which may be between about 3 to 6 mph). One exemplary material is biaxially-oriented polyethylene terephthalate (BoPET) or other forms of polyethylene terephthalate (PET), common examples of which are sold as Mylar.

As best illustrated in FIGS. 1 and 5-7, the body portions 100 are generally shaped and configured to approximate a fish body. The body portions 100 are designed to be mirror images of one another. For ease of review, only one body portion 100 is described below, but it should be understood that a corresponding body portion 100' will have similar features. The body portion has an outer surface 104 that may be printed or otherwise designed with various fish coloring options, such as stripes, scales, varied body or eye colors or options, varied textures, lengths, tail configurations, combinations thereof, or any other options. Similar to the way anglers change lures if the desired species is not biting (or conditions, locations, or target species change), the user of the fishing lure 10 disclosed herein may seek to remove and replace various swim bodies 14 with other swim body options. The swim bodies may be sold as separate components that are interchangeable with a particular vented head 12.

For example, the body portion 100 may have an eye 106 (or at least a portion of an eye) printed on an upper area of the forward portion 24. The body portion may also have fins, scales, and tail features printed thereon. Positioned along a rear portion 108 of each body portion is a tail vent 110. The tail vent 110 generally defines a slit, cut, or other opening in the rear portion 108 that allows water flowing within the open space 18 to exit or otherwise be relieved from the swim body 14. Tail vent 110 functions as a release valve that allows excess water to escape the tail section and avoids water back-up during swimming motion. In a specific example, the tail vent 110 is cut to create a flap 112. When water exits the open space 18, pressure forces the flap 112 open, allowing water to escape, as illustrated by FIG. 9.

Each body portion 100 is also provided with one or more features designed to cooperate with both the locational alignment features 140 and/or the lateral securement features 150 of the vented head 12. As described above, one embodiment of a locational alignment feature 140 may be placement tabs 42 positioned in securement channel 40. In this embodiment, a corresponding locational alignment feature 142 on the body portion 100 would be body grooves 44 along the forward portion 24. In use, the body grooves 44 are positioned such that they receive placement tabs 42. This aligns the body portion 100 with the vented head 12 and prevents upward or downward sliding of the body portion within the securement channel 40. It should be understood that these elements may be changed in design and location. It should also be understood that these elements are provided for exemplary purposes only, and alternate locational alignment features are possible and considered within the scope of this disclosure.

One embodiment of a lateral securement feature 150 may be apertures 48 and pegs 52. In this embodiment, a corresponding lateral securement 152 on the body portion 100 would be apertures 50. It should be understood that these elements may be changed in design and location. The apertures 48 and 50 are aligned receive the pegs 52 of the head cover 22 in use. This wedges the body portion 100 between the head base 20 and the head cover 22 and prevents lateral or backward sliding of the body portion out of the securement channel 40.

It should also be understood that these elements are provided for exemplary purposes only, and alternate locational alignment features 140, 142 and lateral securement features 150, 152 are possible and considered within the scope of this disclosure.

When each side body portion 100 of the swim body 14 is secured with respect to the vented head 12, the open channel 16 is in fluid communication with the open space 18, such that water entering the angled front face 26 of the vented head 12 flows directly into the open space 18 of the swim body 14. Water is then forced out through tail vents 110 and also allowed to escape from the rear of the lure 10, behind tail portion 114. This water flow creates a side-to-side movement of the swim body 14 with respect to the vented head 12 (which remains generally stable due to its connection to a leader line).

It is possible to provide various sizes of vented heads 12 in kits. It is possible to provide various sizes and coloring options of swim bodies 14 in kits. In one example, a single vented head 12 size may be sold with a plurality of varied swim bodies. It is generally desirable that the front portion 24 of the swim body 14 correspond to the size and shape of the securement channel 40 of the vented head 12 for ease of securement. Other than that, the swim bodies sold in the particular kit may have varying lengths coloring options, and so forth, to allow for interchangeability. In another example, a plurality of vented head 12 sizes may be sold with a plurality of swim body 14 sizes and coloring options.

Changes and modifications, additions and deletions may be made to the structures and methods recited above and shown in the drawings without departing from the scope or spirit of the disclosure or the following claims.

What is claimed is:

1. A fishing lure, comprising:
   a vented head comprising an open channel with a rearward taper; and
   a swim body configured to be secured to the vented head, the swim body defining an open space in fluid communication with the open channel.

2. The fishing lure of claim 1, wherein the vented head comprises a head base and a head cover.

3. The fishing lure of claim 2, wherein the head base and the head cover are securable to one another and configured to secure a forward portion of the swim body therebetween.

4. The fishing lure of claim 2, wherein the head cover comprises side legs that extend away from the head base for removal and replacement of the swim body.

5. The fishing lure of claim 1, wherein the vented head comprises one or more locational alignment features configured to secure the swim body in alignment.

6. The fishing lure of claim 5, wherein the one or more locational alignment features comprise cooperation between placement tabs in a securement channel of the vented head and body grooves on the swim body.

7. The fishing lure of claim 1, wherein the vented head comprises one or more lateral securement features for securing the swim body from lateral disengagement with the vented head.

8. The fishing lure of claim 7, wherein the vented head comprises a head base and a head cover, wherein the one or more lateral securement features comprise cooperation between one or more apertures on the head base, one or more apertures on the swim body, and internal pegs on the head cover.

9. The fishing lure of claim 1, wherein the vented head comprises a lower wing.

10. The fishing lure of claim 1, wherein the vented head comprises a weight.

11. The fishing lure of claim 1, wherein the vented head comprises an angled front face.

12. The fishing lure of claim 1, wherein the vented head comprises a leader arm.

13. The fishing lure of claim 12, wherein the leader arm comprises an extension arm and a downward extending arm having a loop hook, wherein the vented head comprises a head base and a head cover configured to be received over the head base, wherein the head base comprises an arm groove, a bracket opening, and a bracket channel, wherein the head cover comprises a bracket positioned along a head base-facing side, and wherein when the head cover is positioned over the head base, the bracket is received by the bracket opening and the extension arm of the leader arm is positioned through the bracket channel and allowed to rest in the arm groove.

14. The fishing lure of claim 1, wherein the swim body comprises one or more tail vents.

15. The fishing lure of claim 1, wherein the swim body comprises two opposing body portions connected by a connection element.

16. The fishing lure of claim 1, wherein the swim body comprises Mylar.

17. The fishing lure of claim 1, wherein the swim body comprises various fish coloring options, stripes, scales, varied body or eye colors or options, varied textures, varied lengths, tail configurations, or any combinations thereof.

18. A fishing lure, comprising:
    a head comprising a rearward-tapered channel extending through an angled front face and a rear face; and
    a swim body extending from the rear face of the head and defining an open space in fluid communication with the rearward-tapered channel.

19. The fishing lure of claim 18, wherein the head further comprises:
    a leader arm disposed on an upper portion of the angled front face and extending downward; and
    a wing disposed on a lower portion of the angled front face.

20. The fishing lure of claim 18, wherein the swim body comprises two opposing body portions removably attached to the head and connected at respective tail portions.

* * * * *